United States Patent [19]
Euzen et al.

[11] Patent Number: 5,658,539
[45] Date of Patent: Aug. 19, 1997

[54] CHAMBERS OF A MOVING BED

[75] Inventors: Jean-Paul Euzen, Dardilly; Maurice Berthelin, Dózon; Jean De Bonneville, Rueil Malmaison; Roland Huin, Borde; Daniel Vuillemot, Saint Genis Laval, all of France

[73] Assignee: Institut Francais du Petrole, Rueil Malmaison, France

[21] Appl. No.: 506,038

[22] Filed: Jul. 24, 1995

[30] Foreign Application Priority Data

Jul. 22, 1994 [FR] France ................... 94 09207

[51] Int. Cl.$^6$ ........................................ B01J 8/08
[52] U.S. Cl. .................. 422/213; 422/145; 422/214; 422/216
[58] Field of Search ........................ 422/145, 213, 422/214, 216, 196; 208/63, 143, 165, 167

[56] References Cited

U.S. PATENT DOCUMENTS

| | | | |
|---|---|---|---|
| 4,498,973 | 2/1985 | Sikonia et al. | 208/63 |
| 4,670,226 | 6/1987 | Furuyama et al. | 422/216 |
| 4,880,604 | 11/1989 | Koves | 422/220 |
| 5,356,462 | 10/1994 | Brüggendick | 96/150 |

*Primary Examiner*—Christopher Kim
*Attorney, Agent, or Firm*—Millen, White, Zelano & Branigan, P.C.

[57] ABSTRACT

An enclosure in which there circulates a moving bed of solid particles (for example a moving-bed catalytic reactor such as a reforming reactor), is delimited in the enclosure by at least one grill. In the enclosure a fluid passes through the bed in a direction different from that of the flow of the assembly of the particles and issues from the bed by way of at least one grill. Disposed in the thickness of said bed in an intermediate wall (grill) such as to distribute the thrust forces produced by the fluid on the particles in the zones of the bed which are delimited in that way. Jamming of the particles against the grill or grills is greatly reduced and the admissible fluid flow rate is then decreased.

14 Claims, 2 Drawing Sheets

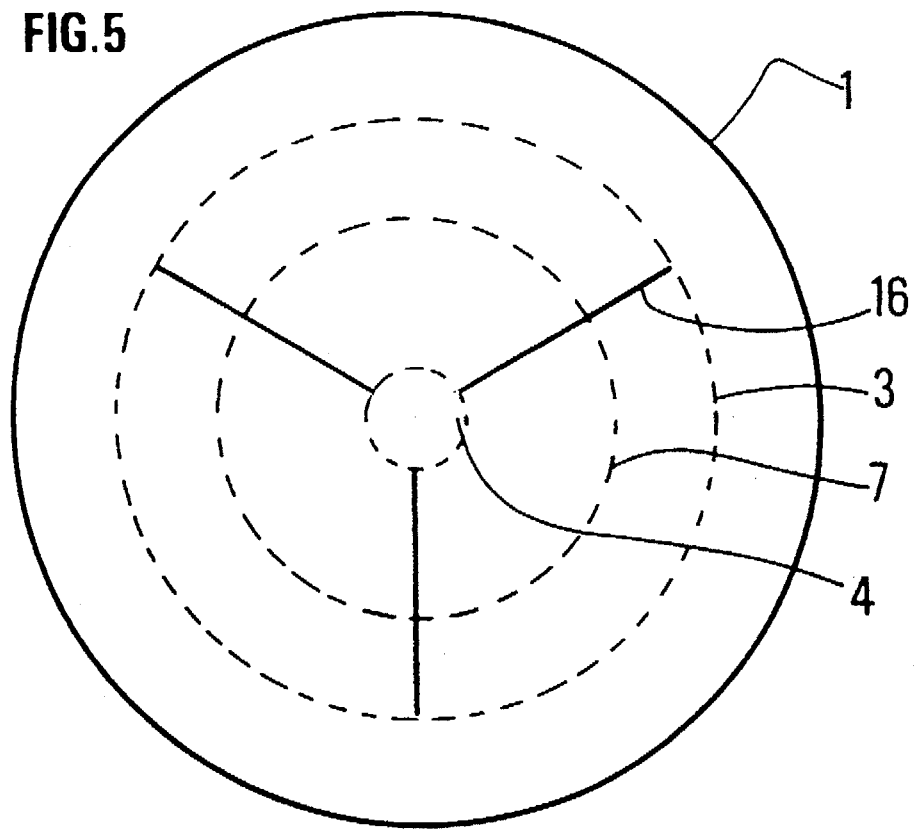

CHAMBERS OF A MOVING BED

BACKGROUND OF THE INVENTION

The invention concerns an improvement in enclosures in which a bed of solid particle flows, referred to as a moving bed. The invention is more particularly applied to moving-bed reactors and in particular moving-bed catalytic reactors such as those used for catalytic reforming, in which solid granular particles (of catalyst) of the same nature (a single catalyst) circulate.

In moving-bed units in which circulation of the solid, which may or may not be catalytic and which may or may not be of spherical shape is effected in the form of a dense bed which flows vertically under the effect of the force of gravity, the walls which define the granular zone most frequently comprise two cylindrical grills or gratings of different diameters. The fluid, in a liquid phase or most frequently a gaseous phase, or possibly the fluids (gas and liquid or liquid and other immiscible liquid) passes through he granular bed (which in this case is also annular) in crossed flow relationship, that is to say with a radial flow configuration, from the outside inwardly, or conversely from the inside outwardly. After having passed through the cylindrical inlet frill the fluid therefore passes through the bed and then issues from the annular space containing the granular medium by passing through a second grill, the outlet grill, which is concentric with the inlet grill.

The flow of the fluid or fluids through the bed causes a pressure drop which depends on a plurality of factors, the main ones of which are the size and the shape of the particles, the properties of the fluid or fluids and the flow rate of the fluid or fluids. That pressure drop manifests itself as a thrust force applied by the fluid against the solid particles in the direction of flow of the fluid. That thrust force which is applied towards the fluid outlet grill modifies the whole of the balance of the forces to which the solid particles (for example balls) are subjected. That phenomenon is of a nature such as to give rise to disadvantages such as a reduction in the speed of the movement of the particles which are against the wall or even jamming thereof against the outlet grill and complete stoppage thereof, which on the one hand seriously affects good systematic utilisation of those particles but which on the other hand can also cause a reduction in the speed of movement of or even stoppage of other particles, more specifically progressively involving complete blocking of the bed (for example a catalytic bed) and complete stoppage of the circulation of the solid. The severity of that phenomenon increases in proportion to an increasing thrust force on the part of the fluid or fluids and thus an increasing capacity of the unit.

That blocking phenomenon therefore constitutes a major limitation in terms of increasing the capacity of the units. It is therefore a particularly attractive proposition to use arrangements and devices which reduce the magnitude of that phenomenon.

That problem arises in acute form in catalytic units such as catalytic reforming units. The risk of the catalytic particles being jammed against the grills then results in a serious reduction in the flow rates of gas to be treated and therefore the capacities of the units.

In addition, in the course of the different treatments involved such as in particular regeneration of the catalytic particles or transfers between the reactors or between the reactors and the regenerators, fragments of balls are formed, which very quickly become jammed against the grills. That fragmented population accelerates the blocking phenomenon.

SUMMARY OF THE INVENTION

The object of the invention is to reduce the risks of jamming of the particles and therefore reducing the frictional force against the grill and in particular the thrust force applied by the fluid phase to the granular medium and more particularly to the particles which are in contact with the outlet grill.

Another aim of the invention is to increase the capacities of the current moving-bed reactors and in particular the catalytic reforming reactors.

The invention is particular well applied to the case involving solid particles of a mean diameter of between 0.1 and 6 mm and preferably between 1.5 and 3.5 mm and indeed between 1.5 and 3.2 mm.

More precisely the invention concerns an enclosure delimited by at least one wall, comprising:

at least one opening for the introduction of solid granular particles, at least one grill delimiting a moving bed of said particles which circulates in the enclosure in a direction substantially parallel to said grill, at least one opening for the introduction of at least one fluid which circulates in said bed in a different direction from that of the assembly of the particles and issues from the bed by way of at least one grill, at least one opening for the outlet of the fluid from the enclosure, at least one opening for the outlet of the particles from the enclosure, said enclosure also comprising at least one wall referred to as an intermediate wall and disposed in the bed of particles, which is permeable to the fluid but impermeable to the solid granular particles and disposed substantially in the direction of flow of the particles, situated at between 0.1 e and 0.75 e, e being the complete thickness of the bed, from the grill by way of which the fluid issues, in such a way that the maximum flow rate of jamming of the particles against the walls is identical for each of the separate zones, said intermediate wall having a coefficient of friction with the particles of between 0.1 and 0.7.

The term enclosure is used to denote a reactor, a silo ... or more generally a zone delimited by at least one wall. The most common case is a reactor (such as for catalytic reforming or other chemical reaction) with a vertical axis and comprising a cylindrical wall, a bottom and a top.

Other forms of reactor may be suitable such as that described in U.S. Pat. No. 5,013,426 comprising a series of parallel compartments containing a catalytic bed.

A moving bed of solid particles is formed in the enclosure, the supply of particles is provided by means of at least one opening and discharge thereof is by means of at least one opening.

In the enclosure the bed of particles can be generally delimited:

by a grill and a wall. This is the case for example when the grill is cylindrical and the bed circulates between the cylindrical wall of the reactor and the grill;

by at least two grills referred to as external and internal grills. Preferably the grills are parallel 2 by 2 or they are concentric. That is the case for example with two cylindrical grills which are disposed concentrically along the axis of the reactor, the bed circulating between the grills.

The assembly of particles flows generally along at least one grill, that is to say the direction of that flow is substantially parallel to said grill. The aim of this is obviously to limit the friction of the particles against the grill and therefore jamming thereof. The term substantially parallel was used to take account of the difficulty of controlling a strictly parallel direction in respect of that flow but overall the general movement is parallel to the axis of the enclosure.

At least one fluid is introduced into the enclosure, the fluid passing through the moving bed and issuing therefrom by way of the grill or grills (referred to as the outlet grill). The invention is advantageously applied in the case where the fluid (fluids) circulates in the bed of particles in a direction different from that of the assembly of the particles. In other words the thrust force caused by the fluid is of such a nature as to run counter to the movement required for the moving bed.

This is the situation frequently encountered with radial fluid flows. The change in the direction of flow of some particles, which is caused by the fluid, carries those particles on to the grill or grills where they can become jammed.

The improvement according to the invention involves placing at least one wall referred to as an intermediate wall in the moving bed of particles which is disposed in the enclosure.

That wall is permeable to the fluid but it withstands the thrust force of the solid particles. Those particles cannot pass through the wall. In the general case it is a grill in which the holes or slots are calibrated in dependence on the granulometry of the solid particles of the bed, but it could equally well a wall such as a rigid membrane. It is obvious that fragments of solid particles can pass through the intermediate grill (for example fines). That effect however is limited.

The intermediate wall defines two zones in the bed.

The position of the intermediate wall, or the positions of those walls if there are a plurality thereof, must be so selected as to distribute the different thrust forces caused by the fluid against the particles of the different zones in a regular and substantially equal fashion so that the maximum flow rate corresponding to particle jamming or blocking is the same for each of the zones which are separated in that way. The space could thus be divided, in the case of a single intermediate wall, depending on the criteria involved, at a position between 0.1 e and 0.75 e, preferably less than 0.5 e and still more preferably between ⅓ e and ⅔ e, e being the complete thickness of the bed, from the outlet grill for the fluid (or respectively between ⅔ and ⅓ from the inlet grill, if such exists).

The maximum flow rate of blocking between two walls of a bed of particles is measured for example in a parallelepipedic enclosure in which the bed of solid particles flows. A transverse flow of air (or another gas) is introduced into the bed by way of a side of the enclosure, which is of a grill-like or grating-like configuration, and issues by way of the opposite side which is of a grill-like or grating-like configuration. The flow rate of gas (air) is varied and the movement of the particles is observed, while measuring the pressure drop.

At the moment at which jamming or blocking of the particles is observed, the pressure drop is recorded, which thus affords the maximum flow rate of blocking under the conditions of the experiment.

Preferably the intermediate wall is parallel to at least one grill and preferably parallel to the grill by way of which the fluid issues or enters (referred to as the inlet grill), when such exists.

The height of the intermediate wall (walls) is preferably substantially equivalent to that of the grill or grills in order to be interposed in the main paths of movement of the fluid. That wall may be of the same nature as the other grills and obviously must be held in position and must afford appropriate resistance, in accordance with the means known to the man skilled in the art.

The intermediate wall must have a coefficient of friction with the particles of between 0.1 and 0.7 and preferably 0.3 and 0.5 in order for the risk of particle jamming or blocking to be reduced. The upper part of the intermediate grill or grills (or walls) stops before the solid-distribution zone and does not offer any obstacle to regular distribution of the solid particles between the two zones on respective sides of that wall. Likewise the lower part can be interrupted before making contact with the bottom of the reactor so as to allow the solid particles to flow without difficulty by way of the opening or openings provided for that purpose. However the wall may also extend from the top to the bottom, or down to the bottom, or up to the top, of the space reserved for the solid, if the preference is for the solid to be supplied and/or removed independently for each of the zones. Partial openings or communications, at the top or at the bottom, may also be employed insofar as they do not interfere with distribution or regular removal of the solid particles.

When there are a plurality of intermediate walls, the space between the walls is preferably at least equal to 30 times the mean diameter of the particles.

BRIEF DESCRIPTION OF THE INVENTION

FIG. 5 shows an embodiment with partitions.

DETAILED DESCRIPTION OF THE INVENTION

Figure 1:
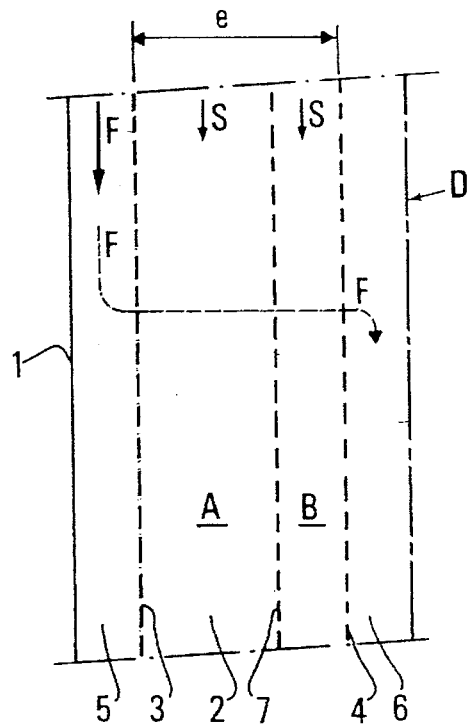
FIG. 1 is a side view in longitudinal sections of one half of the moving bed in a cylindrical reactor.

The explanation of the effect of the intermediate wall will be better appreciated from the diagrammatic view set forth in FIG. 1 by way of non-limiting illustration.

FIG. 1 is a view in longitudinal section of one half of the moving bed in a cylindrical reactor with an axis D, having a wall 1. The moving bed 2 of solid particles is delimited by two grills 3 (fluid inlet grill) and 4 (fluid outlet grill). The fluid F is supplied in the annular zone 5 delimited by the grill 3 and the wall 1. It is collected in the annular zone 6 delimited by the grill 4 (which is here cylindrical). The circulation of the fluid is shown in the Figure. The solid flows generally in a direction which is parallel to the axis of the reactor.

A single intermediate grill 7 is provided here, cutting the annular zone of the bed into two zones:

In the first zone A which is identified with respect to the direction of circulation of the fluid, the thrust force applied by the fluid which passes into the reactor against the particles in the first zone is carried by the upstream face of the intermediate grill but it is not transmitted to the particles which are disposed downstream. That thrust force is therefore limited to a part only of the granular bed.

In the second zone B with respect to the direction of circulation of the fluid, the first particles encountered by the fluid therefore are not now subjected to any force on the part of the particles which are in the upstream zone A, in contrast to that which would occur in the absence of the intermediate grill. As regards the particles encountered at the end of the path of movement of the fluid in that second zone, they are subjected only to the forces relative to a reduced bed thickness and therefore a reduced transverse force which is much less than that which would be applied if the intermediate grill had not been provided.

In each of the zones the particles which ere most heavily subjected to the thrust forces which are exerted not only by the fluid but also by the adjacent particles ere those in contact with the grills for the outlet of the fluid or fluids. By virtue of the proposed arrangement, those forces are reduced to iso-capacity, both in contact with the intermediate grill and with the conventional outlet grill. The result of that is that conversely the blocking limits ere attained for a higher fluid flow rate and consequently:

on the one hand the capacities of the existing units can be increased without the risk of blocking, and on the other hand the units to be constructed may enjoy the benefit of this improvement which, for given capacities, will manifest itself in more compact reactors, better accessibility and enhanced flexibility and versatility of operation.

It will be appreciated that the number of intermediate walls will be selected in dependence on the geometry of the enclosure, the thickness of the bed, the solid particles and the flow rates of the main fluid.

The intermediate wall must have the same characteristics on each of its faces, as the walls conventionally employed for limiting the space reserved for the granular medium. Besides their surface condition which is particularly favourable to sliding movement of the particles, they must be impassable in regard to the solid particles but sufficiently open to facilitate the flow of the fluid in well-distributed manner.

In a particularly advantageous fashion, the intermediate wall or walls (grills) may also serve to provide for controlled modification of the operating conditions in the reactor; it is thus possible to use them for regularly distributing a make-up fluid.

For that purpose the intermediate wall (or the grill) comprises two parallel faces separated by a space into which a fluid referred to as a make-up fluid is fed by way of introduction means.

This arrangement is here referred to as a 'double-face' arrangement. The space between the faces is given by mechanical calculation, it is generally greater than 0.2 cm. That fluid is preferably identical to the main fluid which is introduced into the enclosure or to the treated fluid issuing from the enclosure, but it may also be one of the reactants which it is then possible to introduce progressively and controlledly within the reactor to facilitate the reaction, either by way of the levels of concentration or partial pressures, or by way of the temperatures.

Any means for introducing the make-up fluid may be appropriate; it is for example a diffuser tube for diffusing the fluid over the entire length of the grill.

The attraction of this arrangement is that it is possible to inject the make-up fluid, at a low flow rate, in co-flow relationship or in counter-flow relationship with the main fluid. The openings for injection of the make-up fluid will be arranged in consequential fashion and the flow rate calculated in accordance with the rules by the man skilled in the art. Preferably the flow rate will be at most equal to one-half of the flow rate of the main fluid.

Another attraction is that of being able locally to mix the make-up fluid with the main fluid. Intermixing of the various streams of main fluid which have already passed through the first zone of the reactor can also be favoured by that arrangement. It is also possible to use this 'double-face' arrangement as a heat exchanger, with the fluid or fluids, which is immersed in the reactor without circulation of the granular medium or the fluid being thereby disturbed. A tube for example or a plate etc., in which a heat-exchange fluid circulates, is then disposed in the space between the faces.

It is also possible to use that 'double-face' arrangement to provide a whole series of sensors to permit better knowledge or better monitoring of the state of the fluid or the movement of the particles.

The present invention and its advantageous double-face embodiment are illustrated in the Figures described hereinafter (FIG. 1 having been described above).

Figure 2:
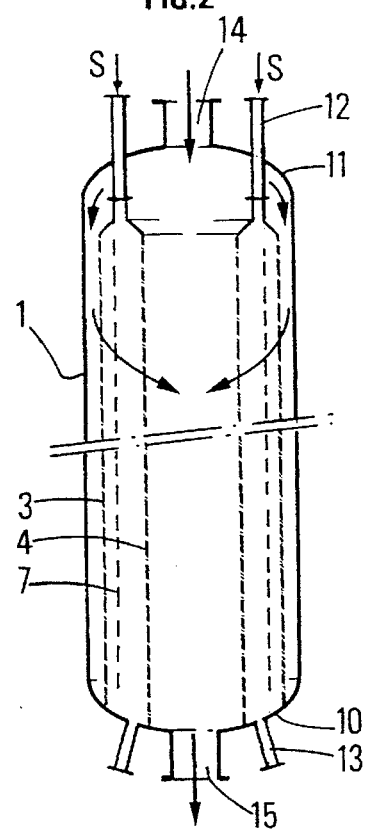
FIG. 2 shows an embodiment in the form of a cylindrical reactor with two grills; a moving-bed reactor typical of catalytic reforming is shown here by way of non-limiting illustration.

As shown in FIG. 2, the reactor comprises a cylindrical wall 1, a bottom 10, a top 11, an external cylindrical grill 3 along the axis of the reactor, and a cylindrical internal grill 4 which is concentric with the grill 3 but of smaller diameter.

The solid particles S are introduced by way of at least one opening 12 in the top of the reactor, and issue from the bottom of the enclosure by way of at least one opening 13, the moving bed of particles circulating between the two grills. The fluid F is introduced by way of at least one opening 14 in the upper part of the reactor and passes through the bed, is collected in the internal volume delimited by the grill 4 and issues from the reactor by way of at least one opening 15 in the lower part of the reactor. The fluid passes through the bed in a different direction from the flow of the assembly of the particles.

The cylindrical intermediate grill 7 which is concentric with the grills 3 and 4 is disposed over the entire height of the bed and advantageously at more than one-third of the thickness from the fluid inlet grill 3.

In this Figure the opening or openings for introduction and discharge of the fluid are arranged to cause the fluid to circulate from the annular space delimited by the wall of the enclosure and the external grill of larger diameter towards the internal volume delimited by the grill of smaller diameter, from which it issues. Circulation of the fluid in the opposite direction may also be appropriate.

In a particularly advantageous fashion, in order to improve the mechanical strength of the bed, the bed of particles may be cut up into sectors by means of one or more walls which are solid walls (partitions) or grills, in particular of 'double-face' type.

Those continuous walls (partitions) are fixed to the internal, external and intermediate grills and are thus involved in the mechanical strength of the assembly. They are arranged parallel to the flow of the solid and they do not afford opposition to the flow of the main fluid. For example they are arranged radially in a cylindrical enclosure.

It is apparent that those walls (partitions) must involve the necessary surface characteristics in order that the solid particles can slide.

Moreover each sector may be fed independently of the other sectors, if necessary.

Those walls (partitions) may be selected so as to be impervious to the fluid or fluids and solids or impermeable to the solid but permeable to the fluid or fluids.

FIG. 5 is an incomplete plan view of a cylindrical reactor (such as that shown in FIG. 2), illustrating partitions 16.

Figure 3:
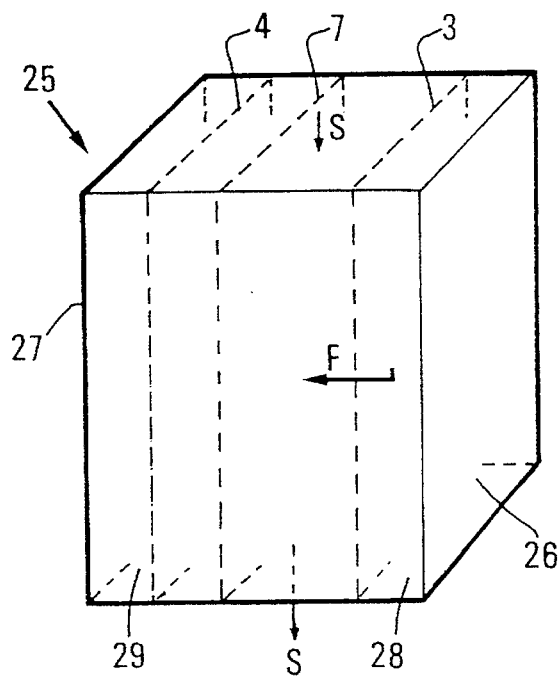
FIG. 3 shows an embodiment in the form of a parallelepiped compartment with two grills.

FIG. 3 is a view in section of a compartment 25 referred to as a parallelepipedic compartment, with its walls 26 and 27, comprising two parallel planar grills 3 and 4, between which the moving bed S circulates, in a direction which here is vertical; the fluid F which is supplied perpendicularly to S in the space 28 delimited by the wall 26 and the grill 3 passes through the bed S and is collected in the space 29 between the wall 27 and the grill 4 from which it issues.

It is thus possible to conceive a reactor with a cylindrical or parallelepipedic sleeve or shroud, comprising one or more parallelepipedic compartments.

More generally, FIG. 3 illustrates an enclosure formed by a reactor comprising at least one parallelepipedic compartment comprising two walls, two parallel planar grills disposed between said two walls delimiting a moving bed of solid particles, and a space between each wall and grill, one for feeding the fluid into the compartment and the other for the discharge thereof, in which enclosure at least one parallelepipedic compartment comprises at least one intermediate wall disposed in the moving bed, in parallel relationship with the other grills.

As previously, at least one wall (partition) delimiting sectors in the bed may be disposed in a direction substantially parallel to the direction of flow of the fluid and substantially parallel to the direction of flow of the whole of the particles.

Figure 4:
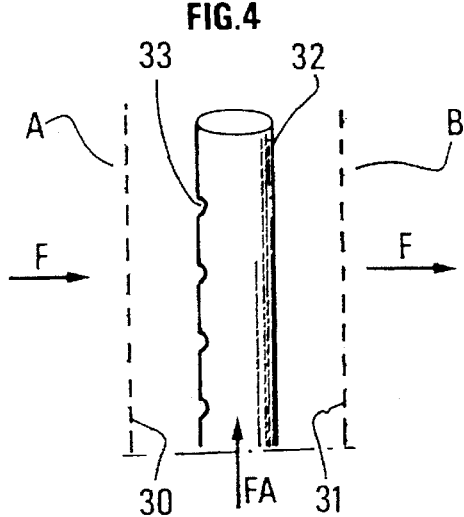
FIG. 4 shows an embodiment of a double-face grill.

FIG. 4 shows an embodiment referred to as a 'double-face' construction. Two separate grills 30 and 31 (or walls) constitute the upstream and downstream faces respectively of the intermediate grill. In this particular case they permit a flow of the main fluid from the zone A towards the zone B, but not such a flow of the solid particles.

Disposed in the space between the two grills is a means for introducing the make-up fluid FA, which here is formed by a diffuser 32 which for example is a tube apertured with orifices 33. They are advantageously disposed facing the upstream face, in such a way as to inject the make-up fluid in counter-flow relationship with the main fluid.

We claim:

1. In a catalytic reactor, an enclosure delimited by at least one wall (1), comprising:

at least one opening (12) for the introduction of substantially similar solid granular particles into the catalytic reactor enclosure, the particles having a mean diameter in the range of 0.1 mm to 6 mm, at least one grill (3, 4) delimiting a moving bed of said particles which circulates in the enclosure in a direction substantially parallel to said grill, at least one opening (14) for the introduction of at least one fluid which circulates in said bed of particles in a different direction from that of the assembly of the particles and issues from said bed by way of at least one grill (4), at least one opening (15) for the outer of said fluid particles from the catalytic reactor enclosure, at least one opening (13) for the outlet of said particles from the catalytic reactor enclosure, the improvement comprising at least one intermediate wall and disposed in the moving bed of particles, said wall being permeable to the fluid but impermeable to the solid granular particles and disposed substantially in the direction of flow of the particles, situated at between 0.1 e and 0.75 e, e being the complete thickness of the bed, from the grill by way of which the fluid issues, wherein the maximum flow rate of blocking of the particles against the walls is identical for each of the separate zones, said intermediate wall having a coefficient of friction with the particles of between 0.1 and 0.7.

2. An enclosure according to claim 1 wherein the bed circulates in the volume delimited by a grill and a wall of the enclosure.

3. An enclosure according to claim 1 wherein the bed circulates in the volume delimited between at least two grills (3, 4).

4. An enclosure according to claim 1 wherein the intermediate wall or walls (7) is or are formed by a grill.

5. An enclosure according to claim 1 wherein the intermediate wall or walls (7) is situated at between one-third and two-thirds of the complete thickness of the bed, from the grill (4) by way of which the fluid issues.

6. An enclosure according to claim 1 the intermediate wall or walls (7) is or are parallel to at least one grill.

7. An enclosure according to claim 1 comprising a cylindrical reactor having a cylindrical wall (1), a bottom (10) and a top (11), two grills (3, 4) which are concentric along the axis of the reactor and delimiting in the reactor a moving bed of solid particles, at least one opening (12) in the top (11) for introducing the solid particles and at least one opening (13) in the bottom for discharge thereof, at least one opening (14) in the upper part of the reactor for introduction of the fluid and at least one opening (15) in the lower part for discharge thereof, the fluid passing through the moving bed in a direction different from the flow of the assembly of the particles, wherein the enclosure also comprises at least one intermediate grill (7) disposed in the moving bed concentrically with the other grills.

8. An enclosure according to claim 7 wherein the opening or openings for the introduction and discharge of the fluid is or are arranged to cause the fluid to circulate from the annular space delimited by the wall (1) of the enclosure and the external grill (3) of larger diameter towards the internal volume delimited by the grill (4) of smaller diameter, from which fluid issues.

9. An enclosure according to claim 8 wherein the opening or openings for the introduction and discharge of the fluid are arranged to cause the fluid to circulate from the internal volume delimited by the grill (4) of smaller diameter towards the annular space delimited by the wall (1) of the enclosure and the external grill (3) of larger diameter.

10. An enclosure according to claim 1 formed by a reactor comprising at least one parallelepipedic compartment (25) comprising two walls (26, 27), two parallel planar grills (3, 4) disposed between said two walls delimiting a moving bed of solid particles, and a space between each wall and grill, one for feeding the fluid into the compartment and the other for the discharge thereof, wherein at least one parallelepipedic compartment also comprises at least one intermediate wall (7) disposed in the moving bed parallel to the other grills.

11. An enclosure according to claim 1 wherein the intermediate wall comprises two parallel faces (30, 31) which are permeable to the fluid but not permeable to the solids, being separated by a space into which a make-up fluid is fed by introduction means (32).

12. An enclosure according to claim 1 comprises at least one wall dividing the bed into a sector or sectors.

13. An enclosure according to claim 1 wherein the enclosure is formed by a reactor containing a moving bed of catalytic particles.

14. An enclosure according to claim 13 wherein the enclosure comprises a catalytic reforming reactor.

* * * * *